(12) United States Patent
Peter

(10) Patent No.: US 12,103,367 B2
(45) Date of Patent: Oct. 1, 2024

(54) WINDOW PANE ASSEMBLY FOR A VEHICLE

(71) Applicant: AUDI AG, Ingolstadt (DE)

(72) Inventor: Markus Peter, Reichertshofen-Hög (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/547,847

(22) PCT Filed: Jan. 18, 2022

(86) PCT No.: PCT/EP2022/050932
§ 371 (c)(1),
(2) Date: Aug. 24, 2023

(87) PCT Pub. No.: WO2022/184338
PCT Pub. Date: Sep. 9, 2022

(65) Prior Publication Data
US 2024/0123802 A1   Apr. 18, 2024

(30) Foreign Application Priority Data

Mar. 4, 2021  (DE) .................... 10 2021 105 257.2

(51) Int. Cl.
*B60J 10/75*  (2016.01)
*B60J 10/40*  (2016.01)
*B60J 10/50*  (2016.01)

(52) U.S. Cl.
CPC ............... *B60J 10/75* (2016.02); *B60J 10/40* (2016.02); *B60J 10/50* (2016.02)

(58) Field of Classification Search
CPC ... B60J 10/75; B60J 10/40; B60J 10/50; B60J 10/60
(Continued)

(56) References Cited

U.S. PATENT DOCUMENTS

| 1,954,268 | A | * | 4/1934 | Simpson | .................. B60J 10/75 49/377 |
| 2,069,219 | A | * | 2/1937 | Conlon | ...................... B60J 1/17 49/377 |

(Continued)

FOREIGN PATENT DOCUMENTS

| DE | 3935629 A1 | * | 5/1991 |
| DE | 4119704 A1 | * | 12/1992 |

(Continued)

OTHER PUBLICATIONS

International Preliminary Report on Patentability directed to related International Application No. PCT/EP2022/050932, with English-language translation attached, mailed Nov. 28, 2022; 11 pages.

(Continued)

*Primary Examiner* — Jerry E Redman
(74) *Attorney, Agent, or Firm* — Sterne, Kessler, Goldstein & Fox P.L.L.C.

(57) ABSTRACT

A window pane assembly for a vehicle includes a window pane that moves in a receiving gap of a receiving shaft between a closed position and an open position. The window pane completely covers a window opening in the closed position and at least partially exposes the window opening in the open position. The window pane includes a first edge region facing the vehicle roof and a second edge region located opposite the first edge region and received in the receiving gap of the receiving shaft. The window pane has a wedge-shaped thickened section on an outer face of the window pane at the second edge region. The thickened section engages an outer seal element when the window is set in the closed position and the vehicle is driving. The thickened section is spatially separated from the outer seal element when the vehicle is parked.

12 Claims, 2 Drawing Sheets

(58) Field of Classification Search
USPC .................................................. 49/374, 377
See application file for complete search history.

(56) References Cited

U.S. PATENT DOCUMENTS

| | | | | |
|---|---|---|---|---|
| 5,791,088 | A * | 8/1998 | Martinelli | B60J 10/75 49/378 |
| 8,549,790 | B2 * | 10/2013 | Murree | B60J 10/75 49/377 |
| 8,894,256 | B2 * | 11/2014 | Gold | B60Q 3/208 362/540 |
| 9,855,829 | B2 * | 1/2018 | Yamada | B60J 1/08 |
| 10,279,666 | B2 * | 5/2019 | Yamada | B60J 10/32 |
| 10,293,665 | B2 * | 5/2019 | Nakamura | B32B 17/10293 |
| 11,260,735 | B2 * | 3/2022 | Yamada | B60J 10/75 |
| 2006/0168892 | A1 * | 8/2006 | Dohles | B60J 5/0459 49/374 |
| 2017/0028830 | A1 * | 2/2017 | Yamada | B60J 10/75 |
| 2017/0028831 | A1 * | 2/2017 | Yamada | B60J 1/2097 |
| 2024/0123802 | A1 * | 4/2024 | Peter | B60J 10/40 |

FOREIGN PATENT DOCUMENTS

| | | | |
|---|---|---|---|
| DE | 102012023147 A1 | 6/2014 | |
| DE | 102014018528 A1 | 6/2016 | |
| DE | 102015005330 B3 | 6/2016 | |
| DE | 102015007449 A1 | 8/2016 | |
| DE | 102015007447 A1 | 12/2016 | |
| DE | 102018107099 A1 * | 9/2019 | |
| EP | 0694429 A1 * | 1/1996 | |
| EP | 0754585 A1 * | 1/1997 | |
| EP | 768201 A1 * | 4/1997 | ............ B60J 10/265 |
| EP | 0822109 A1 * | 2/1998 | |
| EP | 2551138 A1 * | 1/2013 | .............. B60J 10/16 |
| JP | H09328015 A * | 12/1997 | |
| JP | H10119582 A * | 5/1998 | |

OTHER PUBLICATIONS

International Search Report and Written Opinion of the International Searching Authority directed to related International Patent Application No. PCT/EP2022/050932, mailed Apr. 11, 2022, with attached English-language translation; 15 pages.

* cited by examiner

WINDOW PANE ASSEMBLY FOR A VEHICLE

TECHNICAL FIELD

The present disclosure relates to a window pane assembly for a vehicle according to the described embodiments.

BACKGROUND

Window pane assemblies for vehicles having a movable window pane are known in numerous variations. If a vehicle with such a window pane assembly is moved during the winter season, in particular during severe snowfall or rain, the water and snow can quickly accumulate on an outer shaft strip of a seal assembly. The water can then accumulate and freeze on the seal element of the seal assembly of the outer shaft strip. The movable window pane can then no longer be opened until the vehicle is completely heated and the frozen water has melted.

DE 10 2014 018 528 A1 discloses a sealing device for a window pane assembly of the generic type for a vehicle. The window pane assembly comprises a window pane which can be moved in a receiving shaft between a closed position and an open position and which completely covers a corresponding window opening in the closed position, wherein a first edge region of the window pane facing the vehicle roof is received in a pane receiving area and a second edge region which lies opposite the first edge region is received by the receiving shaft. In the open position, the window pane at least partly releases the corresponding window opening. The sealing device comprises at least one seal element for sealing the movable window pane relative to a vehicle body or against a receiving gap of the receiving shaft, and at least one vibration device for influencing an oscillation of the window pane and/or of the at least one seal element. In addition, the sealing device comprises at least one temperature sensor for detecting an ambient temperature of the vehicle. The vibration device can be operated as a function of this detected ambient temperature in order to eliminate a blockage of the window pane that can be caused in particular by the fact that the at least one seal element adheres to the window pane. The seal element can thus freeze to the window pane due to a particularly low ambient temperature, for example. It is also possible that the seal element starts to stick to the window pane due to a particularly high ambient temperature.

It can be regarded as disadvantageous that the disclosed solution is very complex and expensive in design to enable operationally reliable opening of the window pane even at particularly low temperatures.

SUMMARY OF INVENTION

The underlying object according to embodiments of the invention is to provide a window pane assembly for a vehicle with a movable window pane which is simple and inexpensive in design and which, after a standstill period of the vehicle, can be reliably opened in particular at particularly low temperatures.

This object is achieved by a window pane assembly for a vehicle having the features of the embodiments described herein. Advantageous embodiments having useful further developments of the invention are specified in the dependent claims.

In order to provide a window pane assembly for a vehicle with a movable window pane which is simple and inexpensive in design and can be opened reliably in particular at particularly low temperatures, the movable window pane has a wedge-shaped thickened section on the outer face at the second edge region, against which in the closed position of the movable window pane an outer seal element of the seal assembly sealingly lies in a driving operation of the vehicle, and which is spaced from the outer seal element of the seal assembly in the closed position of the movable window pane in a parked state of the vehicle.

Hereinafter, a window pane assembly for a vehicle is understood to mean an assembly comprising a window pane that can be moved in a receiving shaft between a closed position and an open position and which completely covers a corresponding window opening in the closed position, wherein a first edge region of the window pane facing the vehicle roof is received in a pane receiving area. A second edge region of the movable window pane which lies opposite the first edge region is received by the receiving shaft. The window pane at least partly releases the corresponding window opening in the open position. The seal assembly seals the movable window pane against a receiving gap of the receiving shaft.

If the vehicle is parked, the window pane assembly for a vehicle according to embodiments of the invention prevent—due to the spacing or gap between the outer seal element of the seal assembly and the thickened section of the movable window pane—that the outer seal element can freeze to the outer face of the movable window pane at particularly low temperatures. Since in the parked state of the vehicle there is no contact region between the outer seal element and the movable window pane, no ice wedge can form there that could prevent opening of the movable window pane. Actuation of the pane is thus also possible when an outer shaft strip of the seal assembly freezes in the wet state, since there is no contact with the movable window pane. However, due to the spacing or gap between the outer seal element and the thickened section of the movable window pane, small amounts of water can penetrate into the receiving shaft. However, since the receiving shaft is designed as a wet region, the penetrating water can be accepted. In order to prevent wind noise, the outer seal element rests against the thickened section of the movable window pane in a driving operation.

In an advantageous embodiment of the window pane assembly, the movable window pane, when in the closed position and in a parked state of the vehicle, can be lowered relative to the closed position by a predetermined distance to an intermediate position in a driving operation. The distance can be predefined such that the movable window pane still completely covers the corresponding window opening in the intermediate position and that the upper edge region of the movable window pane is still received in the pane receiving area. This enables a particularly simple implementation of the window pane assembly according to embodiments of the invention, since when the vehicle is parked the movable window pane is simply lowered slightly by a drive, which is present in any case, and is easily raised again slightly when the vehicle is started. The movable window pane can be moved, for example, by means of an electric motor, which can be activated by at least one actuating element in order to cause an automatic opening or closing of the movable window pane.

In a further advantageous embodiment of the window pane assembly, the thickened section can be formed, for example, on the second edge region on the outer face of the movable window pane. This means that the movable window pane on the second edge region can be produced with such a wedge-shaped thickened section on the outer face. Alternatively, the thickened section can be designed as a separate component and be connected to the outer face of the movable window pane at the second edge region.

In a particularly advantageous embodiment of the window pane assembly, the thickened section can be designed as a plastic component. The plastic component can be glued to the outer face of the movable window pane at the second edge region. The plastic component can be produced particularly inexpensively, for example, as a mass product in a plastic injection molding process.

In a further advantageous embodiment of the window pane assembly, the plastic component forming the thickened section can replace an end portion of the second edge region of the movable window pane, which end portion is received by the receiving shaft regardless of the position of the window pane. A significant weight saving can be achieved by such a large plastic component which replaces a portion of the movable window pane.

In a further advantageous embodiment of the window pane assembly, an outer part of a body component can form an outer receiving shaft limitation, and an inner part of the body component can form an inner receiving shaft limitation. The outer part and the inner part of the body component can each have two sheet metal elements which are connected to one another at the edge on a common connecting web, for example by welding, gluing, riveting or by other suitable connecting techniques. The seal assembly can be positioned on the common connecting web.

In a further advantageous embodiment of the window pane assembly, the seal assembly can comprise an outer shaft strip with a U-shaped base body, which is fitted onto the outer part of the body component and on which the outer seal element can be arranged. In addition, the seal assembly can comprise an inner shaft strip with a U-shaped base body, which is fitted onto the inner part of the body component and on which at least one inner seal element can be arranged. In the closed position of the vehicle pane, the at least one inner seal element can rest against an inner face of the movable vehicle pane regardless of the vehicle's operating state.

In a further advantageous embodiment of the window pane assembly, the body component can be designed as a vehicle door or as a side part. The movable window pane may be arranged, for example, on the vehicle door. However, it can also be another movable window pane of the vehicle. In the case of convertibles, for example, movable window panes are frequently arranged laterally behind the vehicle doors in the vehicle's longitudinal direction, which window panes are automatically moved from the closed position into the open position when a roof of the convertible is opened.

The features and feature combinations mentioned above in the description, as well as the features and feature combinations mentioned below in the description of the drawing and/or mentioned only in the figures, can be used in the specified combination but also in other combinations or alone without having to go beyond the scope of the invention. Thus, embodiments of the invention that are not explicitly shown or explained in the figures, but are contained in the described embodiments and producible by means of separated feature combinations are to be regarded as included and disclosed.

BRIEF DESCRIPTION OF THE FIGURE

An exemplary embodiment of the invention is depicted in the drawings and explained in more detail in the following description. In the drawings, identical reference signs denote components or elements which perform identical or analogous functions. In the drawings.

DETAILED DESCRIPTION OF THE FIGURE

Figure 1:
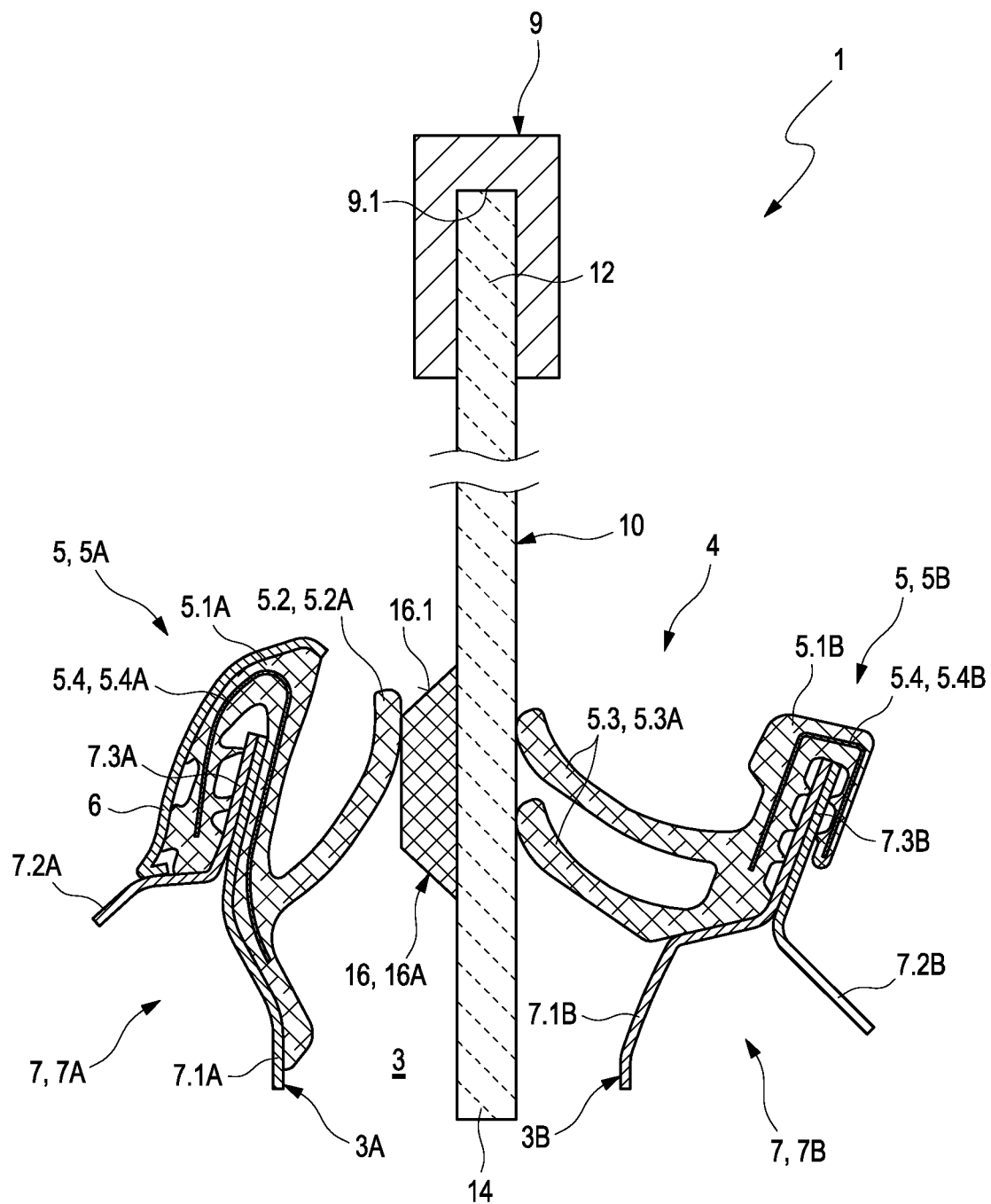
FIG. 1 is a schematic and partial sectional view of a window pane assembly according to an embodiment of the invention for a vehicle in a closed position in a driving operation.
Figure 2:
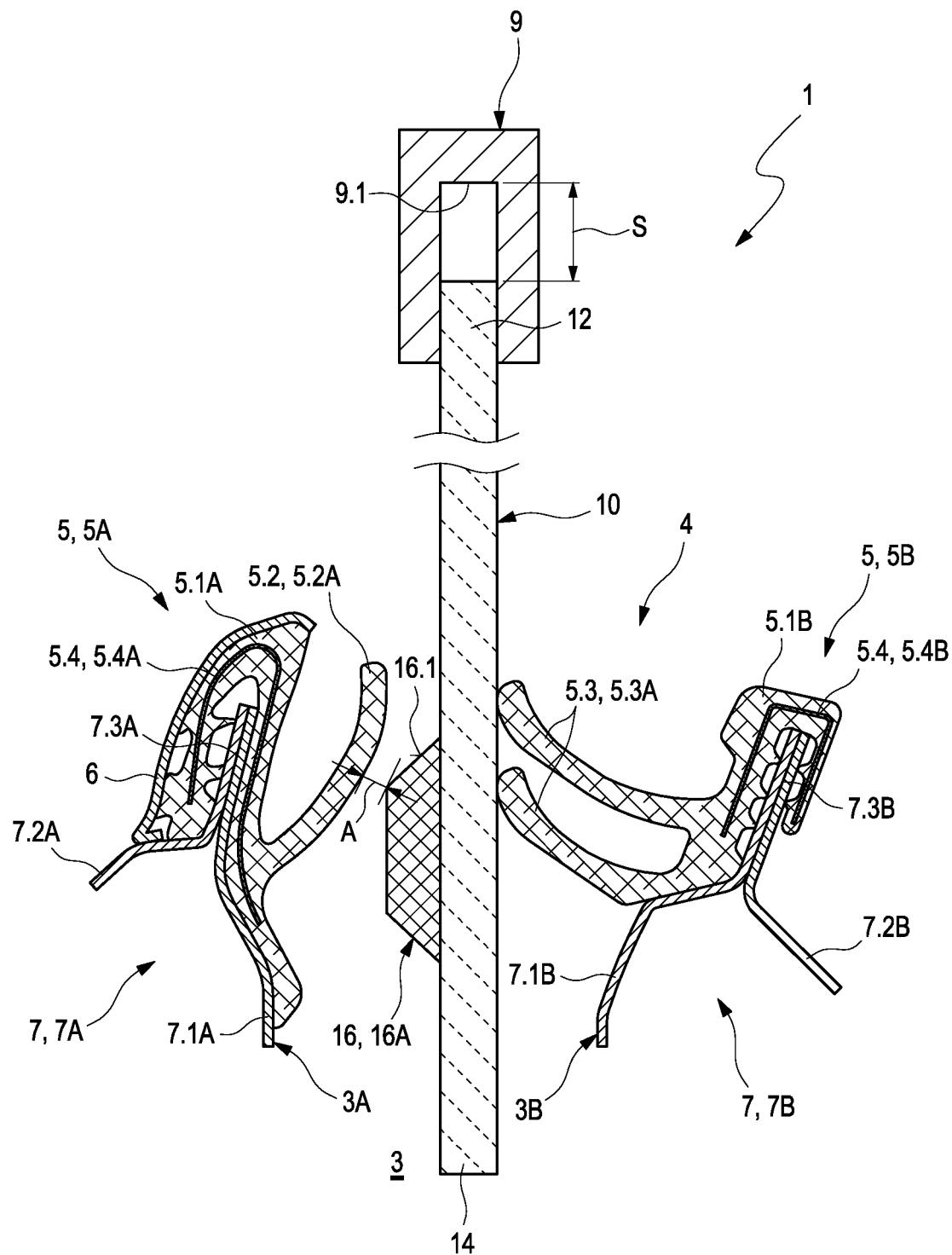
FIG. 2 is a schematic and partial sectional view of the window pane assembly according to an embodiment of the invention for a vehicle from FIG. 1 in a closed position in a parked state of the vehicle.

As can be seen from FIGS. 1 and 2, the illustrated exemplary embodiment of a window pane assembly 1 for a vehicle has a window pane 10 which can be moved in a receiving shaft 3 between a closed position and an open position. The window pane 10 completely covers a corresponding window opening in the closed position, wherein a first edge region 12 of the window pane facing the vehicle roof is received in a pane receiving area 9. A second edge region 14 of the movable window pane 10 which lies opposite the first edge region 12 is received by the receiving shaft 3. In the open position, the window pane 10 at least partly releases the corresponding window opening. A seal assembly 5 seals the movable window pane 10 against a receiving gap 4 of the receiving shaft 3.

According to an embodiment of the invention, the movable window pane 10 has a wedge-shaped thickened section 16 on the outer face at the second edge region 14, said thickened section sealingly lying against an outer seal element 5.2 of the seal assembly 5 in the closed position, shown in FIG. 1, of the movable window pane 10 in a driving operation of the vehicle and being spaced A from the outer seal element 5.2 of the seal assembly 5 in the closed position, shown in FIG. 2, of the movable window pane 10 in a parked state of the vehicle.

As can further be seen from FIG. 2, the movable window pane 10, when in the closed position and in a parked state of the vehicle, is lowered relative to the closed position by a predetermined distance S to an intermediate position in a driving operation. As can further be seen from FIG. 2, the distance S is predefined such that the movable window pane 10 still completely covers the corresponding window opening in the intermediate position and that the upper edge region 12 of the movable window pane 10 is still received in the pane receiving area 9. As can further be seen from FIGS. 1 and 2, a depth of a receiving space 9.1 of the pane receiving area 9, which, for example, is arranged on an upper edge of a vehicle door or on a roof element, is designed such that an upper edge of the movable window pane 10 in the parked vehicle state is still clearly received and guided in the receiving space.

As can further be seen from FIGS. 1 and 2, an outer part 7A of a body component 7 forms an outer receiving shaft limitation 3A, and an inner part 7B of the body component 7 forms an inner receiving shaft limitation 3B. To this end, the outer part 7A and the inner part 7B of the body component 7 each have a first sheet metal element 7.1A, 7.1B and a second sheet metal element 7.2A, 7.2B, which are connected to one another at the edge on a common connecting web 7.3A, 7.3B, preferably by welding. In the illustrated exemplary embodiment of the window pane assembly 1, the body component 7 is designed as a vehicle door. In an alternative exemplary embodiment (not shown), the body component 7 is designed as a side part arranged behind the vehicle door in the vehicle's longitudinal direction.

As can further be seen from FIGS. 1 and 2, the first sheet metal element 7.1A of the outer part 7A in the illustrated exemplary embodiment faces the receiving shaft 3, and the second sheet metal element 7.2A of the outer part 7A forms an outer paneling of the body component 7 designed as a vehicle door. The first sheet metal part 7.1A and the second sheet metal part 7.2A of the outer part 7A are connected to one another on the common connecting web 7.3A, which forms an outer edge of the receiving gap 4 of the receiving shaft 2. In the exemplary embodiment shown, the first sheet metal element 7.1B of the inner part 7B of the body component 7 designed as a vehicle door faces the receiving shaft 3, and the second sheet metal element 7.2B of the inner part 7B faces an interior of the vehicle. The first sheet metal part 7.1B and the second sheet metal part 7.2B of the inner part 7B are connected to one another on the common connecting web 7.3B, which forms an inner edge of the receiving gap 4 of the receiving shaft 2.

As can further be seen from FIGS. 1 and 2, the seal assembly 5 comprises an outer shaft strip 5A with a U-shaped base body 5.1A, which is fitted onto the outer part 7A of the body component 7 and on which the outer seal element 5.2 is arranged. In the exemplary embodiment shown, the outer seal element 5.2 is designed as a sealing lip 5.2A integrally formed on the base body 5.1. For reinforcement or stiffening, a support core 5.4 is integrated in the base body 5.1A of the outer shaft strip 5A which is designed, for example, as a U-shaped support bracket 5.4A. As can further be seen from FIGS. 1 and 2, the base body 5.1A is covered on its outer face by a cover 6 designed as a trim strip, which in the exemplary embodiment shown is fitted onto the base body 5.1A of the outer shaft strip 5A. In addition, the seal assembly 5 comprises an inner shaft strip 5B with a U-shaped base body 5.1B, which is fitted onto the inner part 7B of the body component 7 and on which at least one inner seal element 5.3 is arranged. In the exemplary embodiment shown, two inner seal elements 5.3 are in each case designed as a sealing lip 5.3A integrally formed on the base body 5.1. For reinforcement or stiffening, a support core 5.4 is integrated also in the base body 5.1B of the inner shaft strip 5B which is designed, for example, as a U-shaped support bracket 5.4B. In the exemplary embodiment shown, in the closed position of the vehicle pane 10, the two inner seal elements 5.3 rest against an inner face of the movable vehicle pane 10 regardless of the vehicle's operating state.

As can further be seen from FIGS. 1 and 2, the thickened section 16 in the exemplary embodiment shown of the window pane assembly 10 is designed as a separate component and is connected to the outer face of the movable window pane 10 at the second edge region 14. The thickened section 16 is designed as a plastic component 16A and, in the exemplary embodiment shown, has a start-up slope 16.1 for the outer seal element 5.2. In addition, the plastic component 16A is glued to the outer face of the movable window pane 10 at the second edge region 14.

In an alternative exemplary embodiment (not shown) of the window pane assembly 10, the thickened section 16 is integrally formed on the movable window pane 10 at the second edge region 14.

In a further alternative embodiment (not shown), the plastic component 16A forming the thickened section 16 replaces an end portion of the second edge region 14 of the movable window pane 10, which end portion is received by the receiving shaft 3 regardless of the position of the window pane 10. As a result, the total weight of the movable window pane 10 can be significantly reduced. Thus, in this exemplary embodiment, the plastic component 16A forming the thickened section 16 can have a receiving space that is U-shaped in cross section, analogous to the pane receiving area 9, which receiving space in the fitted state receives the lower end of the movable window pane 10 and, for example, additionally is glued to the movable window pane 10.

REFERENCE NUMBERS

1 Window pane assembly
 3 Receiving shaft
 3A Outer receiving shaft limitation
 3B Inner receiving shaft limitation
 4 Receiving gap
 5 Seal assembly
 5A Outer shaft strip
 5B Inner shaft strip
 5.1A, 5.1B Base body
 5.2 Outer seal element
 5.2A Sealing lip
 5.3 Inner seal element 5.3A Sealing lip
 5.4 Support core
 5.4A, 5.4B U-shaped support bracket
 6 Cover
 7 Body component
 7A Outer part
 7B Inner part
 7.1A, 7.1B First sheet metal element
 7.2A, 7.2B Second sheet metal element
 7.3A, 7.3B Connecting web
 9 (Upper) Pane receiving area
 9.1 Receiving space
 10 Movable window pane
 12 First (upper) end region
 14 Second (lower) end region
 16 Thickened section
 16A Plastic part
 16.1 Start-up slope
 S Distance
 A Spacing

The invention claimed is:
1. A window pane assembly for a vehicle, comprising:
a receiving shaft defining a window opening;
a window pane configured to move in a receiving gap of the receiving shaft between a closed position, an open position, and an intermediate position located between the closed position and the open position, wherein the window pane completely covers the window opening when set in the closed position and when the vehicle is set in a driving operation, and the window pane at least partially exposes the window opening when set in the open position, and the window pane completely covers the window opening when set in the intermediate position and when the vehicle is set in a parked state, wherein the window pane comprises:
a first edge region facing a roof of the vehicle and received in a pane receiving area when set in the closed and intermediate positions, and
a second edge region located opposite to the first edge region and received in the receiving gap of the receiving shaft,
a wedge-shaped thickened section disposed on an outer face of the window pane at the second edge region; and a seal assembly sealing the window pane at the receiving gap of the receiving shaft, the seal assembly including an outer seal element configured to engage the wedge-shaped thickened section of the window pane, wherein the wedge-shaped thickened section engages the outer seal element of the seal assembly when the window pane is set in the closed position, and the wedge-shaped thickened section is spatially separated from the outer seal element of the seal assembly when the window pane is set in the intermediate position.

2. The window pane assembly according to claim 1, wherein when the window pane is set in the intermediate position, the window pane is lowered relative to the closed position by a predetermined distance defined within the pane receiving area.

3. The window pane assembly according to claim 2, wherein the predetermined distance is defined such that the upper edge region of the window pane is still received in the pane receiving area when the window pane is set in the intermediate position.

4. The window pane assembly according to claim 1, wherein the wedge-shaped thickened section is integrally formed on the outer face of the window pane at the second edge region.

5. The window pane assembly according to claim 1, wherein the wedge-shaped thickened section is a separate component connected to the outer face of the window pane at the second edge region.

6. The window pane assembly according to claim 5, wherein the wedge-shaped thickened section is composed of a plastic.

7. The window pane assembly according to claim 6, wherein the wedge-shaped thickened section is glued to the outer face of the window pane at the second edge region.

8. The window pane assembly according to claim 6, wherein the wedge-shaped thickened section forms an end portion of the second edge region of the window pane, and the end portion is received in the receiving gap of the receiving shaft when the window pane is set in the closed and open positions.

9. The window pane assembly according to claim 1, wherein the receiving shaft includes an outer receiving shaft limitation defined by an outer part of a body component of the vehicle and an inner receiving shaft limitation defined by an inner part of the body component.

10. The window pane assembly according to claim 9, wherein the seal assembly comprises an outer shaft strip that includes a U-shaped base body fitted onto the outer part of the body component and the outer seal element extending from the U-shaped base body of the outer shaft strip.

11. The window pane assembly according to claim 9, wherein the seal assembly comprises an inner shaft strip that includes a U-shaped base body fitted onto the inner part of the body component and at least one inner seal element extending from the U-shaped base body of the inner shaft strip, and wherein the at least one inner seal element engages an inner face of the window pane when the window pane is set in the closed and intermediate positions.

12. The window pane assembly according to claim 9, wherein the body component of the vehicle is a vehicle door or a side part.

* * * * *